United States Patent [19]

Benzenberg et al.

[11] Patent Number: 5,751,943
[45] Date of Patent: May 12, 1998

[54] ELECTRONIC WORK ENVIRONMENT FOR A DATA PROCESSING SYSTEM

[75] Inventors: Craig Kay Benzenberg, Raleigh; Lloyd Steven Mann; Lawrence Carl Oslund, both of Cary, all of N.C.; Colleen Ann Roe, Menlo Park, Calif.

[73] Assignee: Alcatel Network Systems, Inc., Richardson, Tex.

[21] Appl. No.: 589,764

[22] Filed: Jan. 22, 1996

Related U.S. Application Data

[63] Continuation of Ser. No. 9,927, Jan. 27, 1993, abandoned.

[51] Int. Cl.$^6$ ............................................. G06F 11/22
[52] U.S. Cl. ........................... 395/183.16; 395/183.22; 395/761; 395/793; 395/200.11
[58] Field of Search ........................ 395/700, 54, 183.02, 395/183.22, 183.06, 180, 183.16, 761, 793, 200.11

[56] References Cited

U.S. PATENT DOCUMENTS

| | | | |
|---|---|---|---|
| 4,649,515 | 3/1987 | Thompson et al. | 395/61 |
| 4,800,485 | 1/1989 | Ackroff et al. | 395/615 |
| 4,817,092 | 3/1989 | Denny | 395/182.08 |
| 4,873,687 | 10/1989 | Breu | 395/182.02 |
| 4,881,230 | 11/1989 | Clark et al. | 371/20.1 |
| 4,918,602 | 4/1990 | Bone et al. | 395/201 |
| 4,982,325 | 1/1991 | Tignor et al. | 395/309 |
| 4,992,972 | 2/1991 | Brooks et al. | 395/338 |

OTHER PUBLICATIONS

"Designing and Writing Online Documentation" by William Horton, pp. 1–10, 18–21, 62, 63, 67, 68, 99–114, 124, 125, 253, 254, 256–258.

"SOFTM: A Software Maintenance Expert System in Prolog" by L. Pau et al. Software Maintenance, 1988 IEEE Conference, pp. 306–311.

"Expert System for Network Configuration and Diagnosis" by Kamel et al. Southeast con. 1990 IEEE Conference Proceedings, pp. 775–778.

*Unlocking the Power of Information,* TechDoc Winter '92. Fort Lauderdale, FL, Feb. 24–28, 1992, pp. 2–12.

"HyperPage™" Application Development System (ADS), IS/R Systems, Inc., West Trenton, NJ (4 page brochure).

*Primary Examiner*—Alvin Oberley
*Assistant Examiner*—Michael T. Richey
*Attorney, Agent, or Firm*—Bell, Seltzer, Park & Gibson

[57] ABSTRACT

An electronic work environment for a data processing system includes documentation modules which execute on the hardware elements of the system. The documentation modules exchange data between the software elements and hardware elements of the data processing system to produce interaction between the documentation modules and the data processing system. A common user interface module displays the results of the interaction between the software and hardware elements and the documentation modules. Accordingly, the documentation becomes part of the operating environment of the data processing system. The documentation modules are generalized documentation modules including online documentation for every possible configuration of the hardware and software elements of the data processing system. The electronic work environment electronically generates customized documentation modules based upon the actual configuration of the hardware and software elements of the system to which it applies, or in response to user queries. The customized documentation modules, or portions thereof, are displayed in response to user requests.

4 Claims, 15 Drawing Sheets

☐ GENERAL SYSTEM DESCRIPTION
☐ APPLICATIONS GUIDE
☐ ORDERING GUIDE
☐ INSTALLATION PROCEDURES
☐ TURN-UP PROCEDURES
☐ ADMINISTRATION
☐ TROUBLESHOOTING
☐ COMMANDS AND MESSAGES

FIG. 9C.

☐ Introduction—For general information about the TM-50.

☐ Functional Overview—For a general overview and a detailed description of the TM-50 circuitry.

☐ Features—For a listing of TM-50 features and a brief description.

☐ Administration and Maintenance—For a broad overview of the software philosophy and interfaces.

☐ Equipment Layout—For mechanical and unit descriptions.

☐ Specifications—For technical specifications of the TM-50 and its units.

FIG. 9D.

```
┌─────────────────────────────────────────────────────┐
│  │ AUTOMATED TROUBLE CLEARING AND MAINTENANCE │      │
│                                                      │
│    STEP 1:  SET UP NETWORK TARGET, COMMUNICATIONS    │
│             PARAMETERS, AND LOGON ID.                │
│             │ USE DEFAULTS │  │ RESET DEFAULTS │     │
│                                                      │
│    STEP 2:  ESTABLISH THE COMMUNICATIONS LINK.       │
│                    │ SETUP LINK │                    │
│                                                      │
│    STEP 3:  SELECT DESIRED FUNCTION.                 │
│   │ RETRIEVE ALARMS │ │ MONITOR MODE │ │ INTERACTIVE MODE │
│                                                      │
│    STEP 4:  DROP LINK OR RETURN TO STEP 3 FOR NEW    │
│             FUNCTION.                                │
│                    │ DROP LINK │                     │
│                                                      │
│  LINK STATUS: IDLE                                   │
└─────────────────────────────────────────────────────┘
```

FIG. 9E.

```
┌─────────────────────────────────────────────────────┐
│ │ AUTOMATED TROUBLE CLEARING AND MAINTENANCE │       │
│                                                      │
│    STEP 1:  SET UP NETWORK TARGET, COMMUNICATIONS    │
│             PARAMETERS, AND LOGON ID.                │
│             │ USE DEFAULTS │ │ RESET DEFAULTS │      │
│  ┌─────────────────────────────────────────────────┐ │
│  │ EDIT DATA AS APPROPRIATE                        │ │
│  │ NETWORK TARGET:                                 │ │
│  │   NETWORK ELEMENT NAME: CIN 123                 │ │
│  │   PHONE NUMBER: (303)555-1212                   │ │
│  │ COMMUNICATIONS PARAMETERS:                      │ │
│  │   LINE SPEED: 1200    PARITY: NONE  STOP BITS: 1│ │
│  │   BITS/CHARACTER: 8   ASCII: YES    TIMEOUT: 2  │E│
│  │   RETRIES: 3                                    │ │
│  │ LOGON ID:                                       │ │
│  │   USERNAME: SMITH    PASSWORD: TURNKEY │CLOSE│  │ │
│  └─────────────────────────────────────────────────┘ │
│  LINK STATUS: IDLE                                   │
└─────────────────────────────────────────────────────┘
```

ELECTRONIC WORK ENVIRONMENT FOR A DATA PROCESSING SYSTEM

This application is a continuation of application Ser. No. 08/009,927, filed Jan. 27, 1993, now abandoned.

FIELD OF THE INVENTION

This invention relates to data processing systems, and more particularly to online documentation for data processing systems.

BACKGROUND OF THE INVENTION

Data processing systems are widely used in many applications. Data processing systems range from personal computers to workstations, minicomputers, mainframe computers and supercomputers. As used herein, data processing systems also include electronic systems which contain a data processing system embedded therein. For example, a data processing system includes the 50 megabyte per second Terminal Multiplexer (TM-50) marketed by Alcatel Network Systems, Inc., Raleigh, N.C., which is used as multiplexer in a synchronous optical telecommunications network (SONET).

A data processing system typically includes both equipment and documentation. The equipment includes hardware elements and software elements which run on the hardware elements to provide the system functionality. The software elements are classified as system software such as an operating system, and application software such as network controller software. The user interfaces to the equipment via an electronic user interface on a display such as a cathode ray tube (CRT). The electronic user interface includes menus, windows, icons, or other well known graphical elements which allow a user to efficiently interface with the system.

The documentation is human readable, written or pictorial information related to the design, construction, testing, maintenance, and operation of the equipment. As is well known to those having skill in the art, documentation may be provided in one or more manuals or may be provided as online documentation which can be searched and accessed electronically. For a complex data processing system, documentation typically includes one or more, and often all, of the following:

(1) System Description Document: This document describes the system and its operational capabilities.

(2) Application Guide: This document describes applications of this equipment to provide service.

(3) ordering Guide: This document specifies how to order new equipment, additional capacity or replacement parts for the system.

(4) Installation Procedures: This document illustrates step-by-step procedures for installing the equipment and/or making modifications thereto.

(5) Turn-Up Procedures: This document describes the step-by-step procedures for bringing-up the equipment after installing and initializing the equipment.

(6) Administration: This document provides step-by-step procedures for operating and modifying the system after installation and turn-up.

(7) Troubleshooting: This document provides procedures for diagnosing problems.

(8) Commands and Messages: This document provides a complete listing of all commands and messages which are used by the equipment. Other documentation may also be provided.

For a simple data processing system, this documentation set may be included as chapters in an owner's manual. However, for a more complicated system, such as the above described SONET system, the documentation set may be provided by eight or more large manuals. Alternatively, online documentation may be provided.

Whether provided on paper or online, the user interfaces with the documentation by accessing the relevant manual or portion thereof. Unfortunately, as data processing systems become increasingly complex, it becomes more difficult to thoroughly understand and efficiently use such massive documentation. Moreover, the user interface to the documentation, whether manual or online, is separate and distinct from the user interface to the equipment. Accordingly, the user is forced to deal with two separate interfaces to access the full functionality of the data processing system.

Online documentation has attempted to simplify user access to documentation. However, the online documentation typically substitutes a new electronic user interface for a paper user interface, and does little to integrate the documentation to the equipment functionality. It is also known to provide "multimedia" systems, which allow documentation to include animation and other multimedia aspects. For example, the Mnemos-I™ portable graphics workstation and Hyperpage™ retrieval software/publishing system marketed by Image Storage/Retrieval Systems, Inc., West Trenton, N.J. are document delivery systems which provide for interactive documentation production and use. Yet again, however, the user must access the documentation from a separate user interface from that of the equipment.

Expert systems have also been used in an attempt to simplify equipment diagnostics. See U.S. Pat. No. 4,649,515 to Thompson et al. entitled Methods and Apparatus For System Fault Diagnostic and Control; U.S. Pat. No. 4,817,092 to Denny entitled Threshold Alarms for Processing Errors in a Multiplex Communications System; U.S. Pat. No. 4,873,687 to Breu entitled Failing Resource Manager in a Multiplex Communication System; and U.S. Pat. No. 4,881,230 to Clark et al. entitled Expert System for Processing Errors in a Multiplex Communications System. Again, however, these expert systems are separate and distinct from the documentation.

U.S. Pat. No. 4,992,972 to Brooks et al. describes a data processing system including online documentation which resides in a number of help modules. Online information is built from a source document by analyzing tags in the document to construct modules in the help objects, and tables to specify and link user input words to route words and topics associated with the modules. Finally, U.S. Pat. No. 4,800,485 to Ackroff et al. describes a data processing system having an online documentation facility in which users of the system are provided with the capability of defining "user specific" documentation for a particular documentation command by specifying modifications to be made to the "system documentation" for that command. Although these patents attempt to simplify the user interface to documentation, greater simplification is necessary as the complexity of data processing systems increases.

SUMMARY OF THE INVENTION

It is therefore an object of the present invention to provide an improved data processing system and method.

It is another object of the present invention to provide an improved documentation system for a data processing system, and a method of using the documentation system.

It is yet another object of the present invention to provide an improved data processing system including online documentation and a method of using the same.

These and other objects are provided, according to the present invention, by an electronic work environment for a data processing system in which software elements execute on hardware elements and documentation modules also execute on the hardware elements. The documentation modules include at least one of a system description module, an application guide module, an ordering guide module, an installation procedures module, a turn-up procedures module, an administration module, a troubleshooting module, and a commands and messages module. Means are also provided for exchanging data between at least one of the software elements and at least one of the documentation modules which are executing on the hardware, to produce interaction between the software elements and documentation modules. Data may also be exchanged between at least one of the hardware elements and at least one of the documentation modules. A common user interface module, responsive to the data exchanging means, displays the results of the interaction between the software and hardware elements and the documentation modules.

Accordingly, a complete set of documentation is provided as executable modules on a data processing system so that the documentation can interact with the data processing system hardware and software elements. A common user interface is provided for accessing the documentation along with the data processing system functionality. By providing interaction among the documentation modules and the hardware and software elements, the documentation does more than statically exist on a shelf or as an online readable document. It becomes part of the operating environment of the data processing system. Moreover, by providing a common user interface, the line between the documentation and the product functionality becomes transparent to the user, so that complex data processing systems can be installed, operated and maintained with minimal difficulty.

According to an aspect of the present invention, the documentation modules are generalized documentation modules including online documentation for every possible configuration of new and/or added hardware and software elements of the data processing system. The data processing system also includes means for identifying the predetermined hardware and software elements which are actually present in that data processing system, and the configuration of the hardware and software elements. A customized documentation module is then created electronically, which reflects the predetermined configuration of the hardware and software elements on the system to which it applies. The customized documentation module, or portions thereof, are displayed in response to user request. The displayed portions reflect the actual configuration of the hardware and software elements on the data processing system as opposed to every possible configuration of hardware and software elements.

Thus, for example, a customized system description module is generated based upon the actual hardware and software elements which are included in the data processing system, rather than providing a system description which reflects every possible data processing system configuration. As another example, the application guide module is tailored to the specific configuration of hardware and software on which it is running, rather than providing generic application information. Similarly, the installation procedures module and the turn-up procedures module are customized to the particular configuration of hardware and software elements present in the data processing system, and may provide interactive audio and/or video to facilitate installation and turn-up for the particular configuration of hardware and software elements. The customized installation procedures module and the customized turn-up procedures module also exchange data with a customized troubleshooting module, described below, to provide troubleshooting during installation or turn-up if errors occur.

In another example of customization, a customized troubleshooting module is generated to reflect the hardware and software elements which are actually contained in the data processing system, rather than reflecting troubleshooting for every possible configuration of the data processing system. The customized troubleshooting module also interacts with the operational hardware and software to provide status monitoring and initiate the proper troubleshooting procedures based on error messages which are obtained. Moreover, if the customized troubleshooting module reveals a faulty component, the troubleshooting module interfaces with the customized ordering guide module, described below, to initiate ordering of a replacement part.

A customized ordering guide module reflects additional components which may be ordered to run on the data processing system, based on the existing configuration of the system. The ordering guide module initiates ordering of a replacement part, or of additional parts to expand the capacity of the system, based on the system as it already exists. It thus becomes easy to order replacement parts and not exceed the system capacity. Moreover, when the replacement part arrives, the ordering guide module interacts with the customized installation procedures module and the customized turn-up procedures module, to direct installation and turn-up, and then interact with the customized troubleshooting module to test the newly installed part.

As yet a final example, the customized administration module detects that the data processing system is approaching capacity limits, based on the actual configuration of the data processing system. An order for additional capacity and may be generated via the customized ordering module. Installation, turn-up, administration, troubleshooting and ordering are thus greatly simplified for complex data processing systems.

BRIEF DESCRIPTION OF THE DRAWINGS

FIGS. 9A–9G illustrate examples of display screens produced by the electronic work environment of FIG. 3 during operation thereof.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
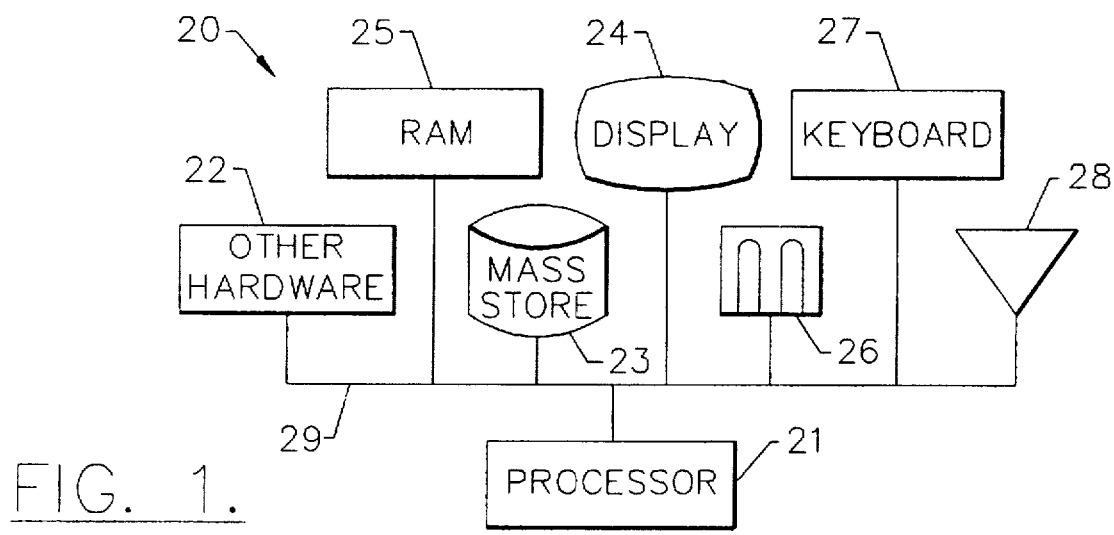
FIG. 1 illustrates a block diagram of hardware elements in a monolithic data processing system which includes an electronic work environment according to the present invention.

Referring now to FIG. 1, a block diagram of hardware elements in a monolithic data processing system, which includes an electronic work environment according to the present invention, will now be described. As shown in FIG. 1, monolithic data processing system 20 includes a plurality of hardware elements. Processor 21 may, for example, be the central processing unit of a personal computer, work station, minicomputer, mainframe or supercomputer. Alternatively, processor 21 may be an embedded central processing unit in computer controlled electronic equipment, such as a synchronous optical network controller (SONET) system which also includes other hardware elements 22, but which is regarded as a data processing system for purposes of the present invention.

Still referring to FIG. 1, the data processing system 20 also typically includes random access memory 25, mass store 23 such as magnetic or optical disks, a graphical video display unit 24 such as a cathode ray tube, a pointing device such as a mouse 26, a user input device such as a keyboard 27 and a sound generator 28 such as a speaker. These hardware elements may be connected using a bus 29 or other known means. The electronic work environment is preferably fabricated from software modules which are stored in mass store 23 and in RAM 22, and which execute on processor 21 in response to user inputs at mouse 26 or keyboard 27, or in response to void input, hardware signals or software instructions, and which produce displays on display 24. Since each of the hardware elements of data processing system 20 will vary from system to system and are well known to those having skill in the art, they will not be described further herein.

Figure 2:
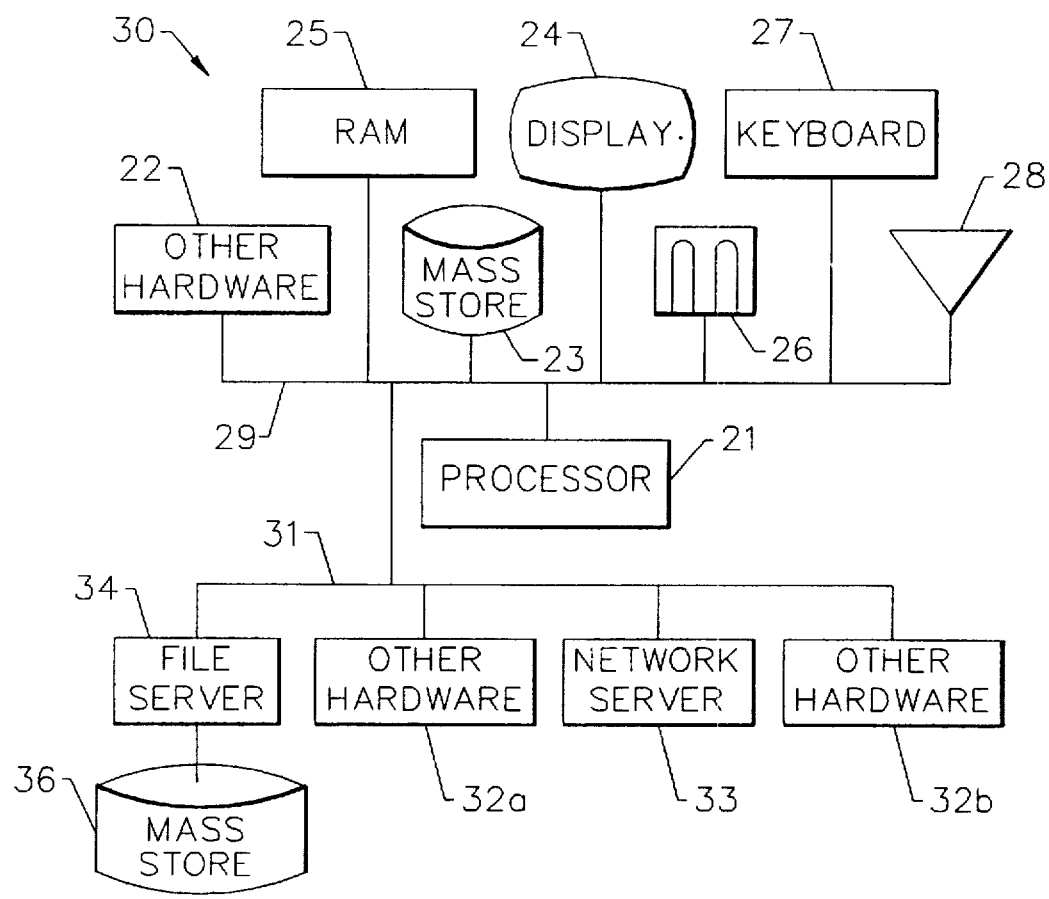
FIG. 2 illustrates a block diagram of hardware elements in a distributed data processing system which includes an electronic work environment according to the present invention.

As shown in FIG. 1, the electronic work environment of the present invention may execute on the processor to which it applies. However, it will be understood by those having skill in the art that the electronic work environment may be implemented on a processor which is separate from the hardware to which the electronic work environment applies. For example, an electronic work environment in a distributed data processing system may be provided. FIG. 2 illustrates a distributed data processing system including an electronic work environment according to the present invention.

Referring now to FIG. 2, the distributed data processing system 30 includes hardware elements such as processor 21, RAM 25, mass store 23, display 24, mouse 26, keyboard 27 and sound generator 28, as already described in connection with FIG. 1. Other hardware elements 22 may also be included. A communications network 31 connects the bus 29 with other hardware elements 32a and 32b; for example a SONET system. A network server 33 may be included to control communications along the network 31. A file server 34 and mass store 36 may also be included. Accordingly, in this environment the user accesses the electronic work environment of the present invention via processor 21 although the electronic work environment is intended to describe and operate other hardware. Since the hardware elements of a distributed data processing system are well known, and will vary from system to system, further description is not necessary.

Figure 3:
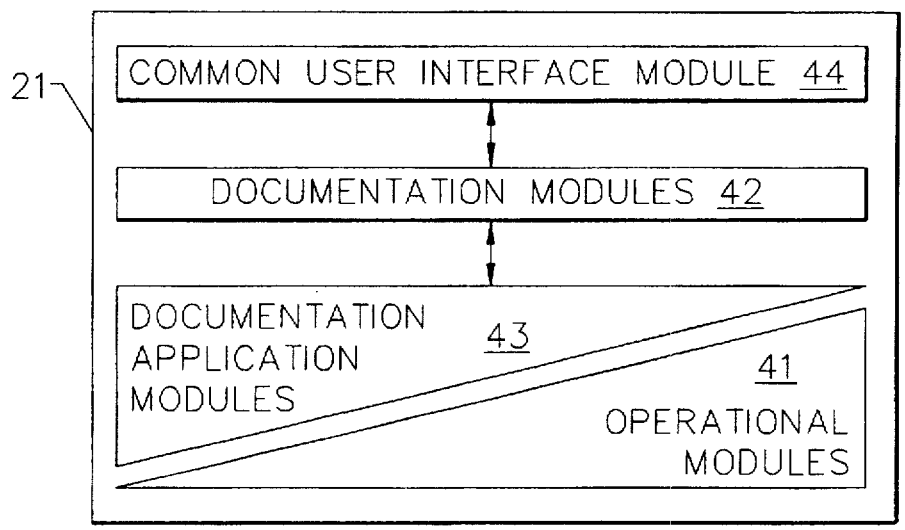
FIG. 3 illustrates a block diagram of an electronic work environment according to the present invention.

Referring now to FIG. 3, a software block diagram of an electronic work environment according to the present invention is illustrated. It will be understood by those having skill in the art that each of the software elements or modules described in connection with FIG. 3 is preferably implemented using one or more computer programs, although hardware modules may also be provided for these functions. As such, each of the modules is shown executing on processor 21. It will also be understood by those having skill in the art that in a distributed processing system, the software modules described below may execute on the other hardware 32a or 32b illustrated in FIG. 2, rather than on processor 21.

Still referring to FIG. 3, the electronic work environment includes a plurality of operational modules 41, for causing the data processing system hardware elements to perform predetermined operational functions upon execution of the operation modules on the data processing means 21 or other hardware element 32a, 32b. Examples of operational modules will be described below in connection with FIG. 5. Also executing on processor 21 are a plurality of documentation modules 42. Documentation modules 42 provide a complete documentation set for the data processing system including the hardware elements (processor 21, and the other hardware 22, 32a, 32b) and the software elements (operational modules 41) which execute thereon. They will be described in detail below in connection with FIG. 4.

Exchanging means, such as documentation application modules 43, is responsive to execution of the operational modules 41 and the documentation modules 42 on processor 21, and causes data exchange between the documentation modules 42 and operational modules 41 to produce interaction between the hardware and software elements and the documentation modules 42. Examples of documentation application modules will be described below in connection with FIG. 6. Finally, common user interface module 44 is responsive to user inputs at keyboard 27 or mouse 26, or user voice input, and displays the results of the interaction of the operational modules 41 and the documentation modules 42 on the display 24, as described below in connection with FIG. 7.

Figure 4:
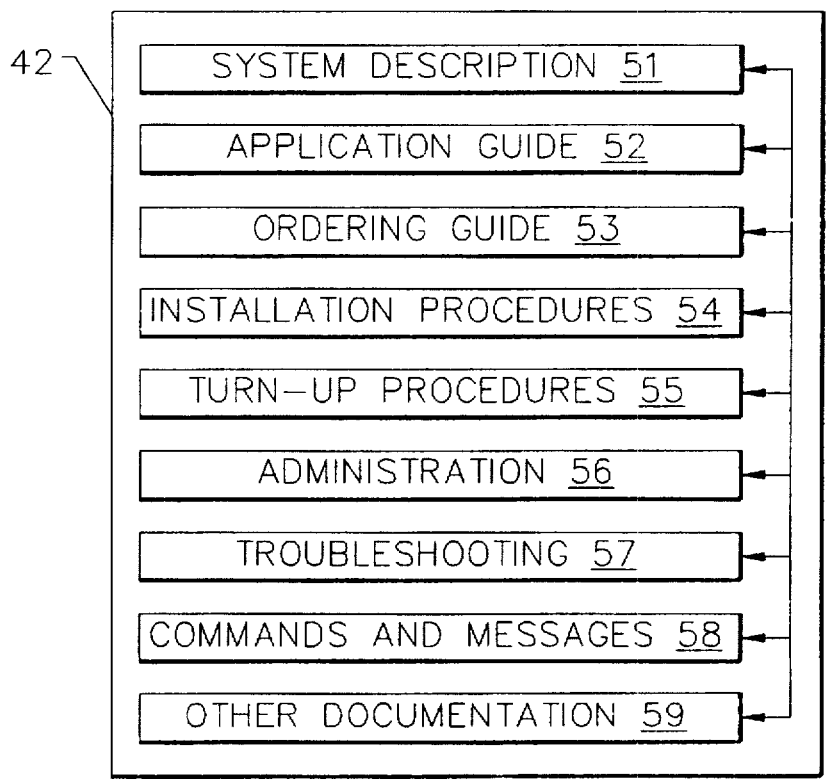
FIG. 4 illustrates a block diagram of documentation modules in the electronic work environment of FIG. 3.

Referring now to FIG. 4, a block diagram of the documentation modules 42 will be described. As shown, the documentation modules 42 include a system description module 51, an application guide module 52, an ordering guide module 53, an installation procedures module 54, a turn-up procedures module 55, an administration module 56, a troubleshooting guide module 57, a commands and messages module 58 and other documentation module 59. These modules 51–59 correspond to well known paper documentation chapters or volumes which are typically supplied with a data processing system and need not be described further herein. According to the invention, modules 51–59 interact with operational modules 41 via documentation application modules 43 to produce an electronic work environment for a data processing system via a common user interface module 44. As also shown in FIG. 4, modules 51–59 interact with each other in a manner which will be described below.

Figure 5:
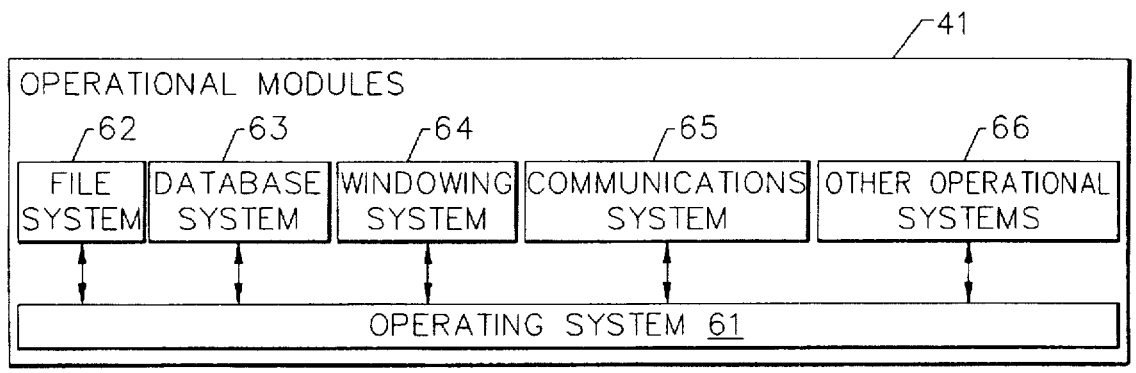
FIG. 5 illustrates examples of operational modules in the electronic work environment of FIG. 3.

Referring now to FIG. 5, examples of operational modules 41 (FIG. 3) will now be described. As shown, operational modules 41 may include an operating system 61 (for example Microsoft DOS for operating on a 486-based PC), a file system 62, a database system 63 (such as Oracle), a windowing system 64 (which may be Microsoft Windows), communication system 65 (such as Procom, by Datastorm) and other operational systems 66. Many other suitable software packages may be used for each of systems 61–66, and the systems will vary dramatically depending upon the size of the data processing system and its intended purpose. Accordingly, these operational modules need not be described further herein.

Figure 6:
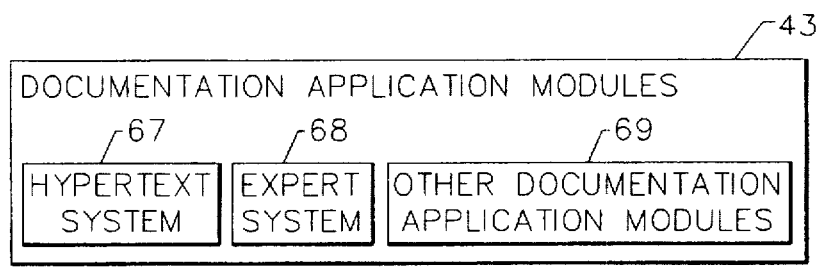
FIG. 6 illustrates examples of documentation application modules in the electronic work environment of FIG. 3.

Referring tow to FIG. 6, documentation application modules 43 include a hypertext system 67 (such as the Plus system marketed by Spinnaker), one or more expert systems 68 (which may be designed using Nexpert by Nexpert, Inc.) and other documentation application modules 69. Documentation application modules 43 produce the interaction between documentation modules 42 (FIG. 4) and operational modules 41 (FIG. 5) as described in detail below, to provide an electronic work environment for a data processing system. Since the components of documentation application modules 43 are known to those having skill in the art, they will not be described further herein.

Figure 7:
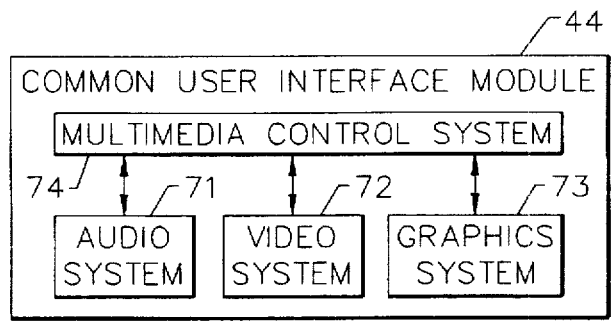
FIG. 7 illustrates a common user interface module for the electronic work environment of FIG. 3.

Referring now to FIG. 7, common user interface module 44 provides a common user interface for documentation modules 42 and operational modules 41. Common user interface module 44 (which may be designed using Windows Development Toolkit by Microsoft) includes an audio system 71 (such as Sound Recorder by Microsoft), a video system 72 (such as Premiere by Adobe), a graphics system 73 (such as Macdraw by Claris, Inc.) and a multimedia control system 74 for controlling systems 71–73. Many other systems are available commercially, and a particular system will depend upon the particular application. Accordingly, these systems need not be described further herein.

Referring again to FIG. 3, documentation application modules 43 are illustrated in triangular shape to conceptually illustrate the varying amount of interaction (data exchange) which may take place between documentation application modules 43 and operational modules 41. This degree of interaction will depend upon the particular documentation module 42 (FIG. 4) and also will depend on the extent to which the electronic work environment is implemented. While those skilled in the art will envision other interactions among the documentation application modules 43 and the operational modules 41 and documentation modules 42, preferred interactions will now be described.

The system description module 51 interacts with operational modules 41 by producing a customized system description which is based on the actual configuration of operational modules 41, processing means 21 and other hardware elements 32a, 32b which are present in the data processing system. Accordingly, rather than providing a generalized online system description module, which describes every possible configuration of the data processing system, a customized online system description module is provided which reflects the actual configuration of the hardware and software elements of the data processing system.

Similarly, the application guide module 52 interacts with operational modules 41 to provide a customized applications guide which is tailored to the specific configuration of hardware and software elements, rather than a generic applications guide. The installation procedures guide module 53 and turn-up procedures module 55 are customized to the particular configuration of the hardware and software elements and may provide interactive video to facilitate installation and turn-up for the particular configuration. Moreover, the customized installation procedures module and customized turn-up procedures module also interact with the troubleshooting module to provide troubleshooting during installation and turn-up if errors occur.

The administration module 56 interacts with the operational modules 41, and specifically with a data collection module which is typically part of an is operational module 41. A data analysis module, which is typically part of documentation application module 43 can be used to analyze the data which is collected from the data collection process. Moreover, the administration module 56 also detects capacity limits of the hardware or software and the ordering guide module is directed to generate an order for additional capacity.

Troubleshooting module 57 interacts with the operational modules 41 and hardware by interacting with a maintenance subsystem which is typically part of operational modules 41, and providing a diagnostic expert system as part of documentation application modules 43. The diagnostic expert system provides customized troubleshooting of the hardware and software elements, based upon their actual configuration in the system. In other words, the expert system performs many of the steps of a decision tree which are otherwise performed by the user or administrator.

The diagnostic expert system interfaces with the troubleshooting module 57 and executes the troubleshooting module to perform automatic troubleshooting. Moreover, if the troubleshooting module 57 reveals a faulty component, the troubleshooting module interacts with the ordering guide module 53 to initiate ordering of a replacement part. When the replacement part arrives, the ordering module 53 interfaces with the installation procedures module 54 and turn-up procedures module 53 to direct installation, and then interfaces again with troubleshooting module 57 to test the newly installed part. These interfaces may be designed as part of documentation application modules 43 as will be described in detail below.

Finally, the commands and messages module 58 interacts with operational modules 41 and the hardware to display only those commands which are executable on the hardware using the operational modules 41, in the correct command syntax. Customized commands and messages are thereby provided.

Referring now to FIGS. 8A–8H, the operations performed by the electronic work environment according to the present invention will now be described. It will be understood by those having skill in the art that these operations are performed by documentation application modules 43, documentation modules 42 and common user interface module 44 as will be described below.

Figure 8A:
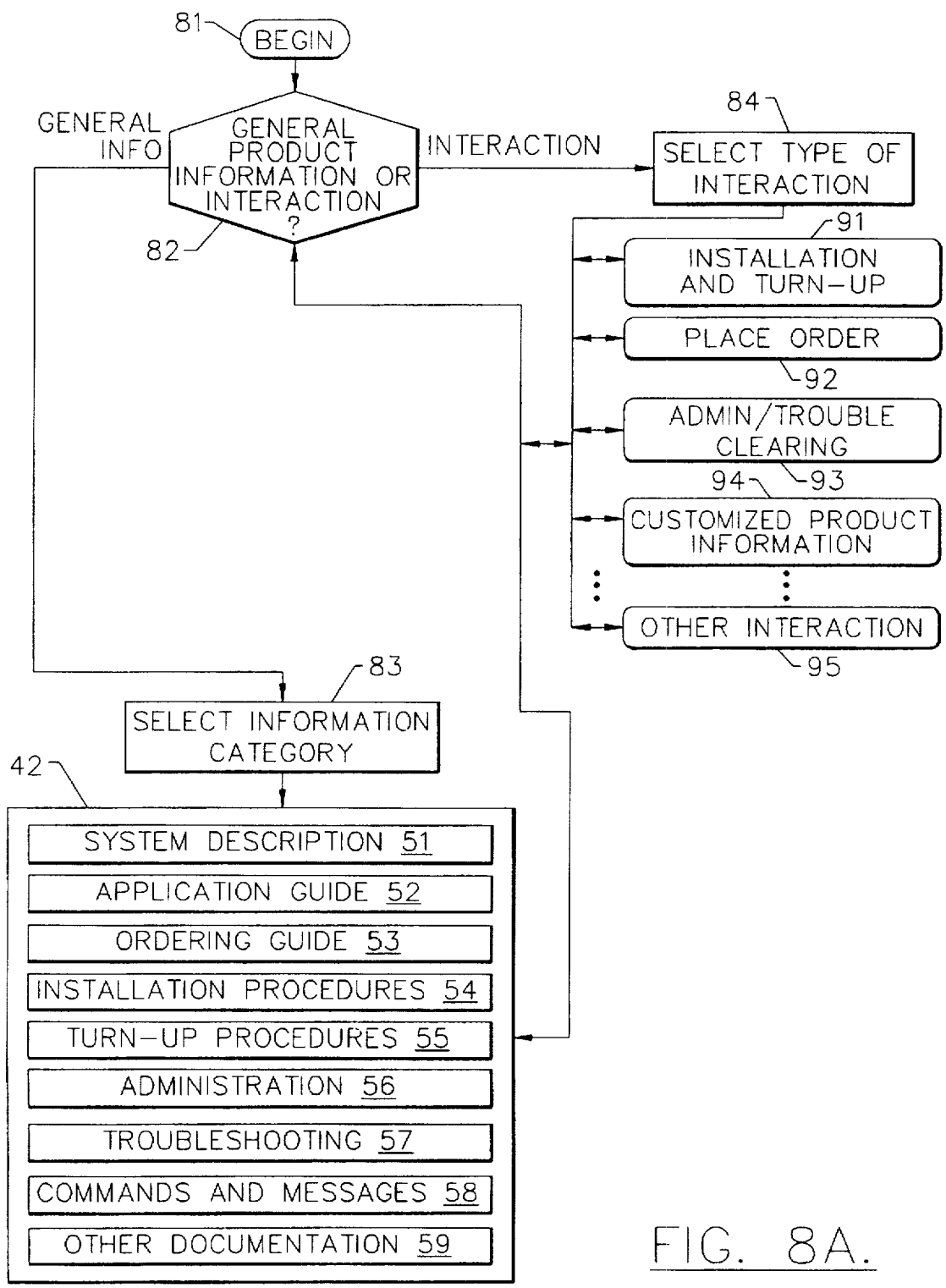
FIGS. 8A–8B illustrate examples of operations performed by the electronic work environment of FIG. 3.
Figure 9A:
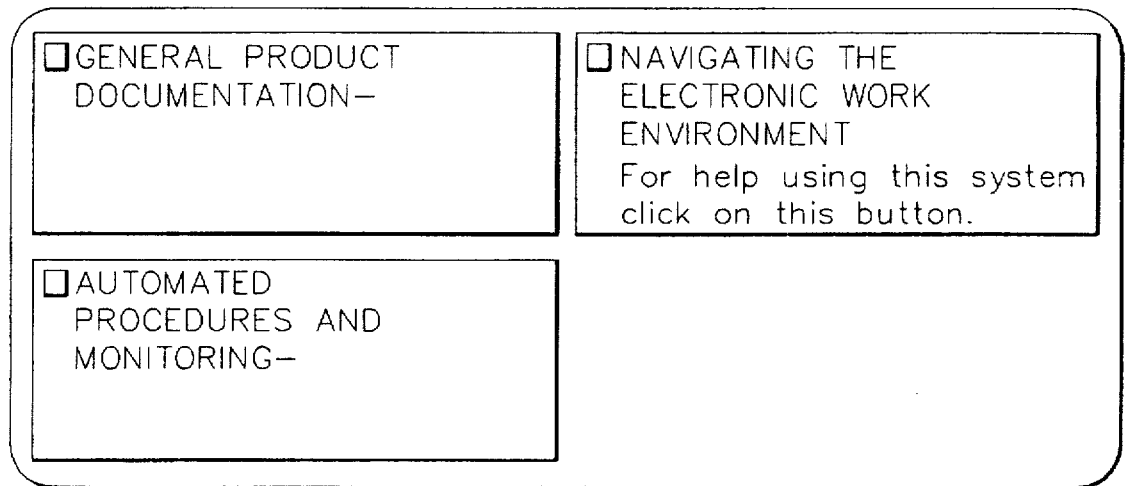

Referring now to FIG. 8A, operations begin at Block 81 when a user accesses the data processing system 20 (FIG. 1) or 30 (FIG. 2) using display 24, keyboard 27 and/or mouse 26. In particular, the display of FIG. 9A is displayed on display 24. Accordingly, as shown in Block 82 of FIG. 8A, the user is given the choice of accessing general product information, referred to in FIG. 9A as "General Product documentation", or of interacting with the product via the electronic work environment, referred to in FIG. 9A as "automated procedures and monitoring". As also shown in FIG. 9A, "help" information may be provided. Icons, function keys or other means may be provided to log off the electronic work environment and perform other documentation functions such as document navigation, bookmarking and annotation. These means are well known to those having skill in the art and need not be described further herein.

Figure 9B:
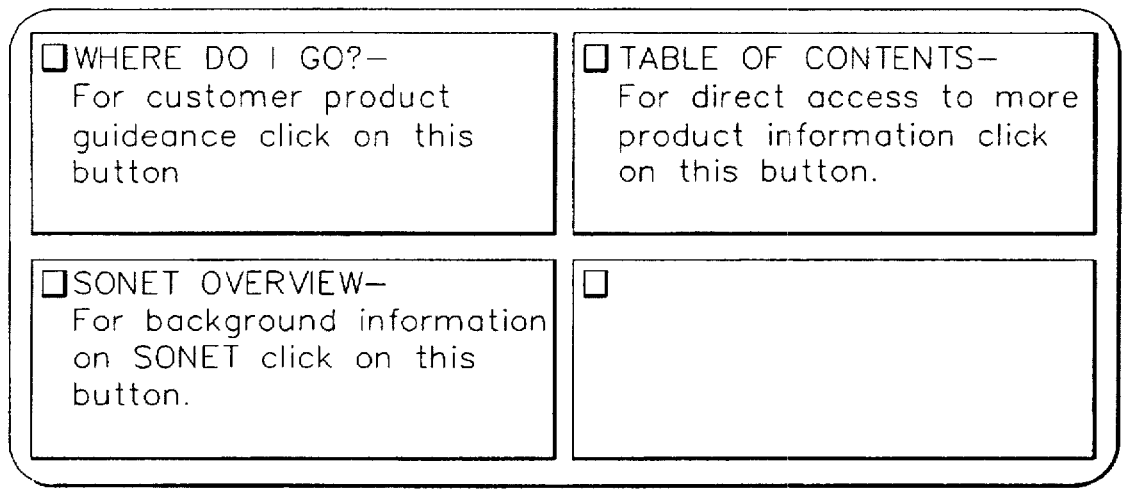

If the general product information is selected at Block 82, a screen similar to FIG. 9B is displayed to allow the user to select an information category. An information category may be selected for customer product guidance, for background information, or for a table of contents to access the generalized documentation modules 42 (FIG. 4). If the "table of contents" selection is made, then an index through the documentation modules 42 of FIG. 4 may be provided, for example, as displayed in FIG. 9C. Upon selecting the appropriate documentation module 42 it is displayed in a hierarchical arrangement, for example as illustrated in FIG. 9D. The user can page through the documentation at higher and lower hierarchical levels.

Returning again to FIG. 8A, if the interactive mode is selected (Block 84), for automated procedures and monitoring, then the user is asked to select the type of interaction. As shown in FIG. 8A, the type interaction can be installation and turn-up 91, order placement 92, administration or trouble clearing 93, customized product information 94, and other interactions 95. These interactions will be described below.

Figure 8B:
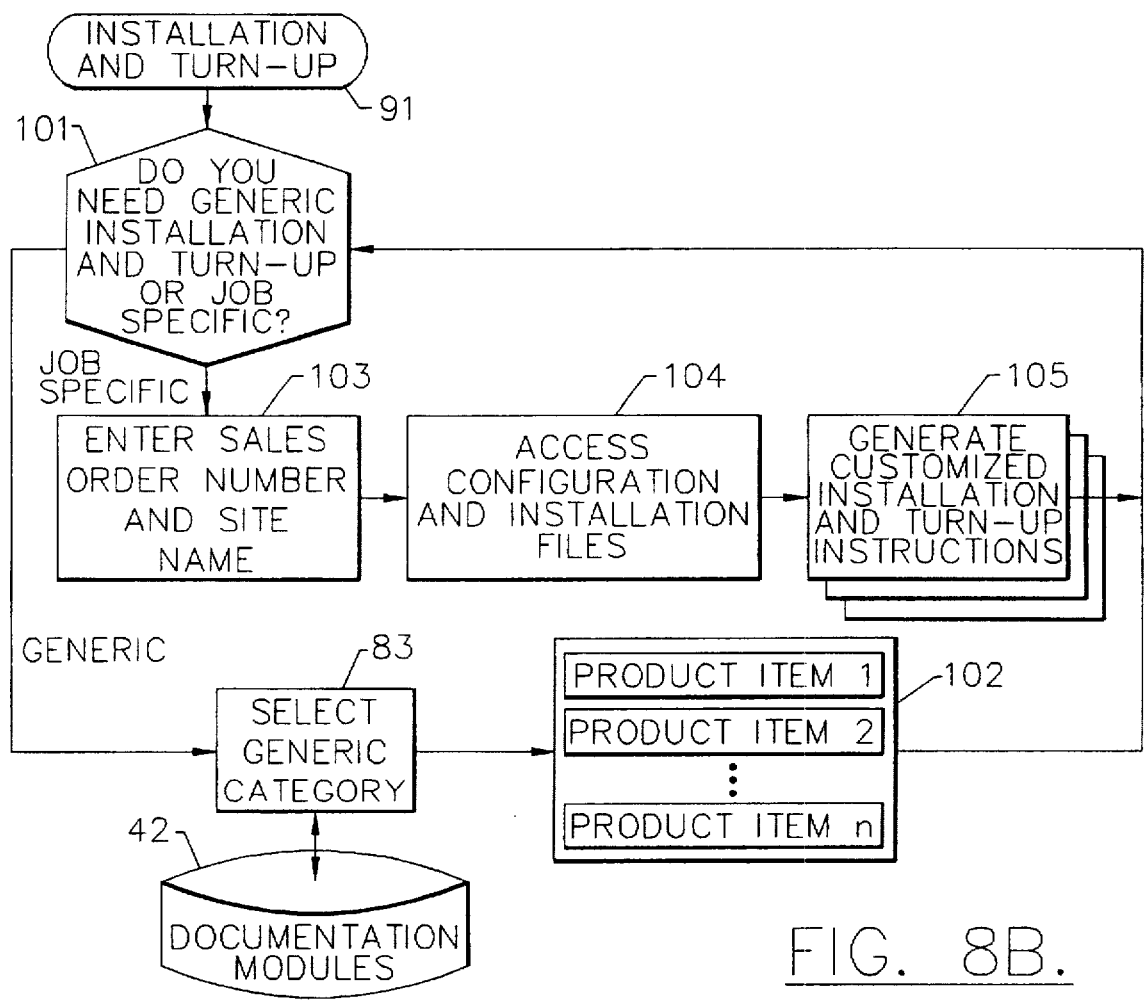

Referring now to FIG. 8B, interactive installation and turn-up 91 begins by inquiring as to whether generic installation and turn-up, or job specific installation and turn-up are required (Block 101). If generic installation is required, then the generic category is selected as already described at Block 83, and the product installation procedures module 54 is accessed as already described in connection with FIG. 8A. As the user steps through these instructions, he can access the instructions for installing and turn-up of a plurality of product items 1-n as shown at Block 102. For example, product item 1 might be installation instructions for a new seven foot rack, product item 2 might be installation and turn-up instructions for adding a shelf to an existing rack, and product item n might be installation and turn-up instructions for product and product related items (such as wiring of power, ground, signal and alarms).

Alternatively, if job specific installation instructions are selected at Block 101, the user is asked to enter the sales order number and site name corresponding to the job specific instruction which is required, at Block 103. Alternatively, if a sales order number and site name are not available, the part number to be installed may be entered. Then, the configuration and installation files are accessed at Block 104 as will be described in detail in connection with FIG. 8C, and customized installation instructions are generated at Block 105.

Figure 8C:
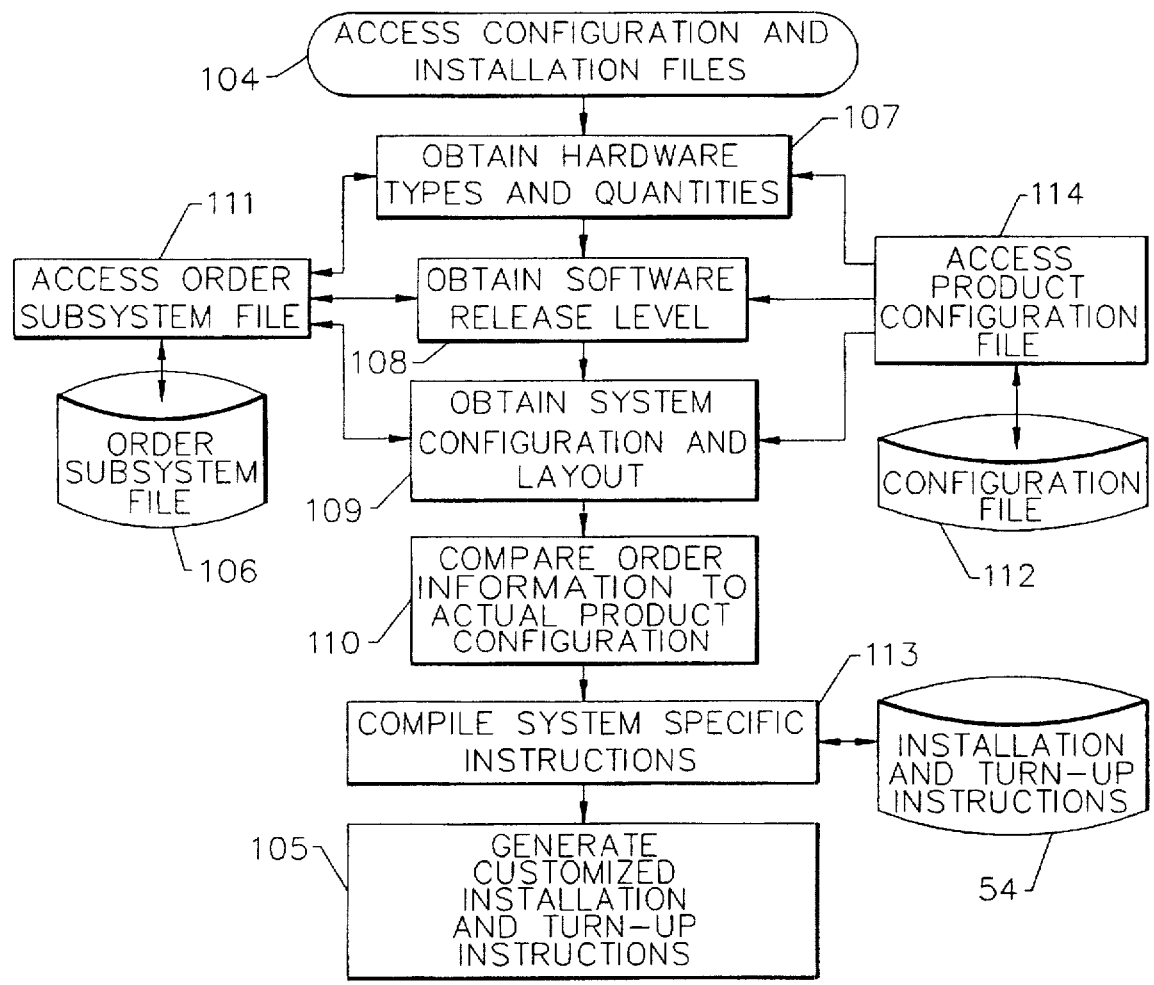

Referring now to FIG. 8C, the details for accessing the configuration and installation files (Block 104) of FIG. 8B in order to generate customized installation instructions (Block 105 of FIG. 8B) will now be described. As shown, an order subsystem file (Block 106) exists with a detailed listing of all items ordered under each sale order number. At Block 111, the order subsystem file is accessed to retrieve the information concerning the particular item to be installed. At Block 114 the product configuration file 112 is accessed to obtain the product configuration information. If the product is not yet installed, only the order subsystem file 106 is accessed.

At Block 107, information regarding the hardware type and quantities is accessed from the order subsystem file 106 and product configuration file 112 if applicable. At Block 108, the information regarding the software release level is accessed from the order subsystem file 106 and the product configuration file 112 if already installed. At Block 109, the configuration and layout of the data processing system is obtained. It will be understood by those having skill in the art that many techniques can be used to detect the configuration of hardware in a data processing system, and many techniques can be used to detect releases and capacities of software modules which are running on the data processing system. A snapshot of the hardware and software configuration may be placed in configuration file 112 for use in generating customized instructions. The customized instructions may be displayed on display 24, printed on a printer or stored for later use.

Then, at Block 110 the order information is compared to the actual product configuration, and the installation procedures module 54 is used along with the system configuration and layout 109 to compile system specific instructions at Block 113. If the product is not yet installed, only the order subsystem 106 is accessed and used. Only those procedures which are necessary are accessed to generate customized installation instructions at Block 105. For example, when a product is installed and power is supplied for the first time, the product is not ready to carry or interact with the customer's communication requirements. The product then goes through a series of customer interactions to alter the product to site specific requirements. In this case, at initial installation and turn-up, the customer must verify options on hardware and send software commands to the product. Accordingly, customer turn-up or provisioning is provided.

Figure 8D:
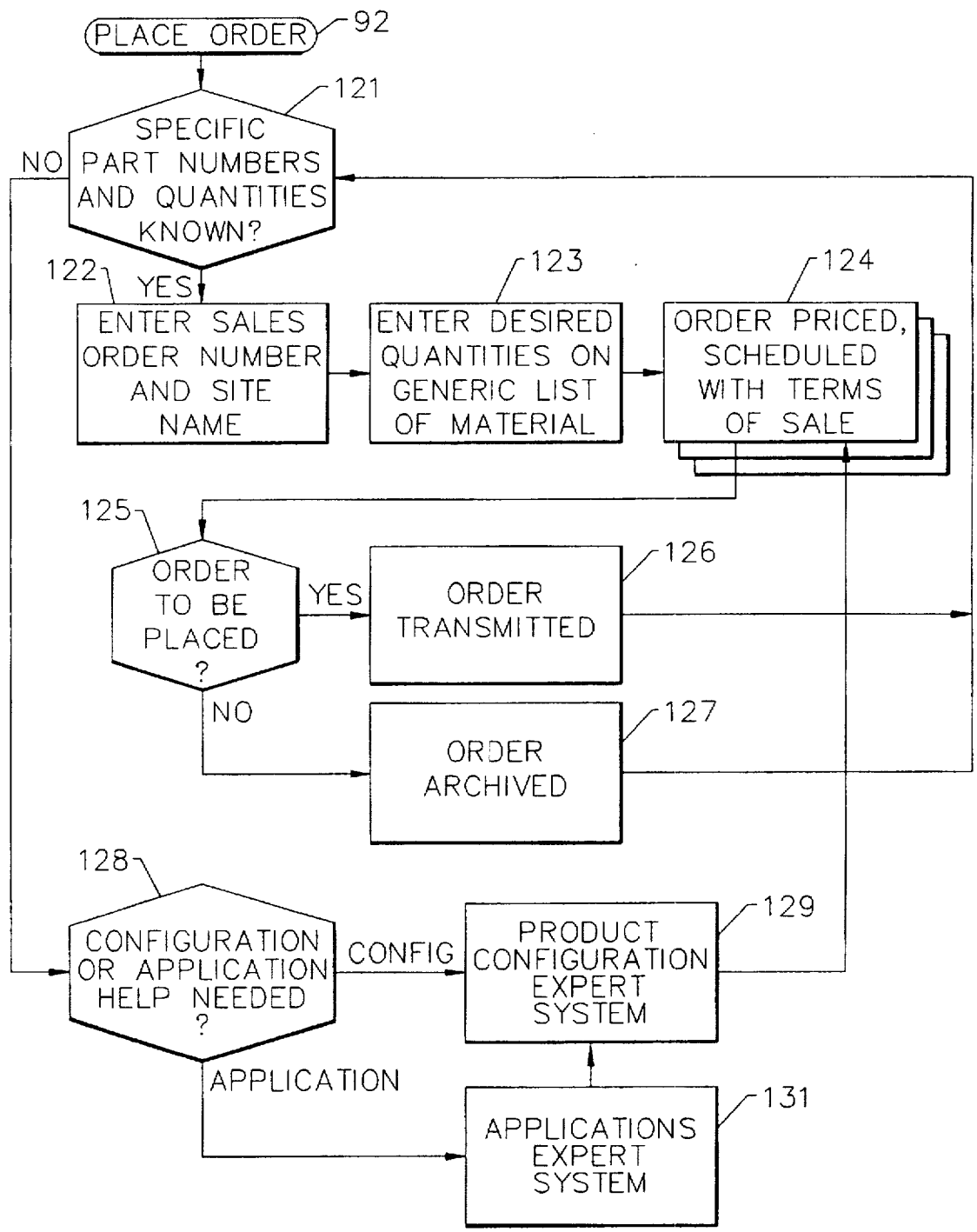

Referring now to FIG. 8D, the operations for placing an order (Block 92 of FIG. 8A) will now be described. As shown at Block 121, an inquiry is first made as to whether specific part numbers and quantities are known. If yes, then a request is made at Block 122 for entry of the sales order number and site name, and at Block 123 for entry of the desired quantities. The order is then priced and scheduled along with the terms of sale at Block 124. An inquiry is then made at Block 125 as to whether the order should be placed. If yes, the order is transmitted to the vendor at Block 126. It will be understood by those having skill in the art that transmission can be via paper order forms which are printed, or may be via electronic order transmission. If the order is not to be placed at the present time, then the order is archived at Block 127 for later reference or transmission.

Referring again to Block 121, if specific part numbers and quantities are not known, an inquiry is made at Block 128 as to whether configuration or application help is needed. Configuration help implies that the user knows the product he wishes to order but does not know the configuration of the product. Application help implies that the user knows he wishes to order a product but does not know which one or which configuration.

If application help is designated at Block 128, then an applications expert system 131 is initiated. The applications expert system provides the user with guidance as to the correct product that may be a candidate to fill the requirements. The applications expert system retains the knowledge of this product and allowable configurations. From a series of questions and the user responses thereto, the expert system produces information on the recommended product.

Upon identification of a specific product, the expert system then triggers the product configuration expert system, Block 129. The product configuration expert system may also be directly accessed from Block 128 upon indication that configuration help is needed. The configuration expert system uses the specific product as the starting point, and via interaction with the user, configures or sizes the product to fully meet the user's requirements. The design of expert systems 129 and 131 are well known to those having skill in the art and will vary considerably from application to application. Accordingly, they need not be described further herein.

Figure 8E:
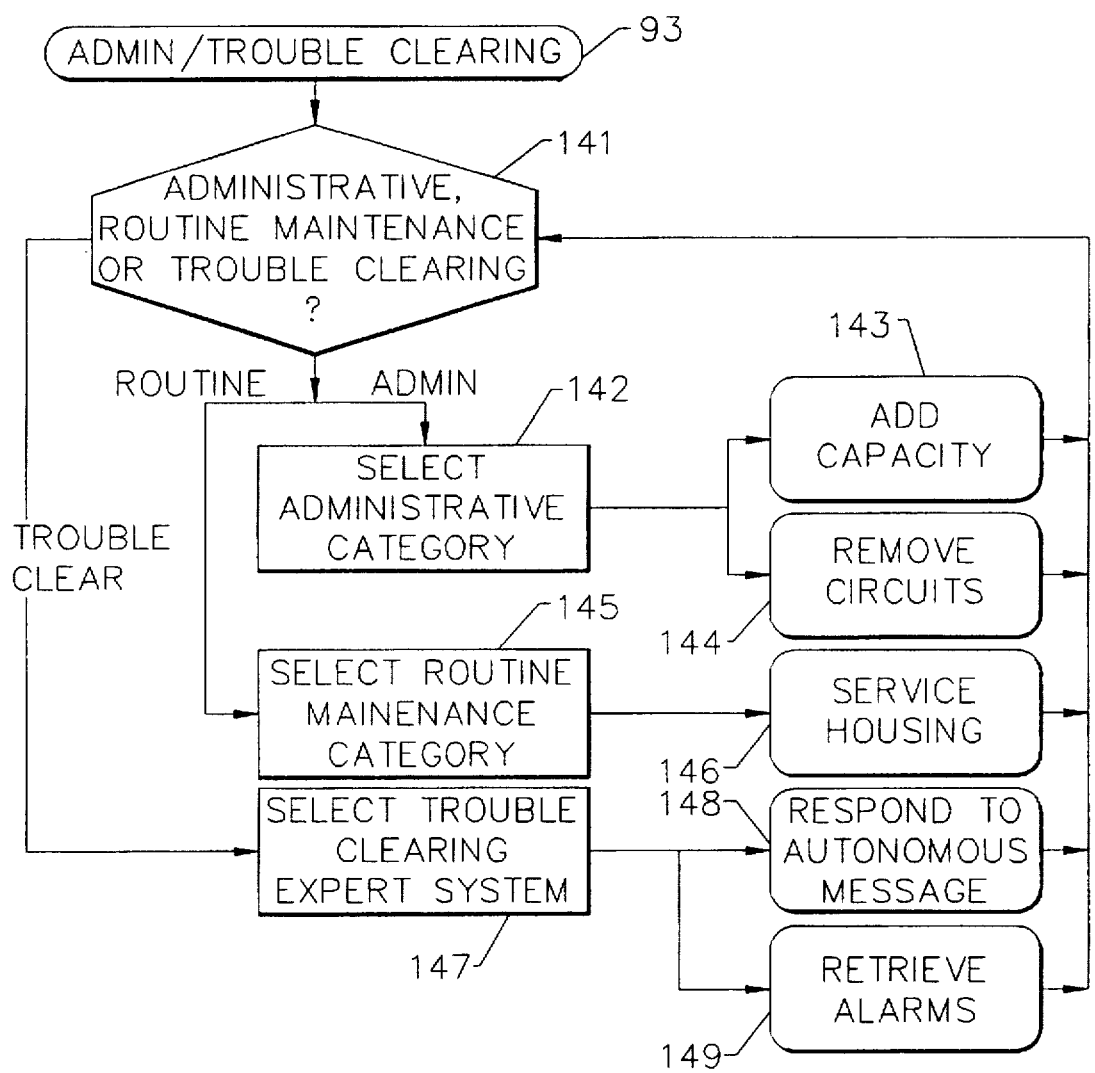

Referring now to FIG. 8E, the operations for administration and trouble clearing (Block 93 of FIG. 8A) will now be described. At Block 141, the user selects from the categories administrative, routine maintenance or trouble clearing. If administrative is selected, then at Block 142 the user is asked to select from administrative categories. Two administrative categories are shown. Block 143 adds capacity to the system and Block 144 removes circuits from the system. However, it will be understood by those having skill in the art that other administrative categories can be provided for. If routine maintenance is selected at Block 141, then at Block 145 the routine maintenance category is selected. Only one category of routine maintenance is shown, i.e. service housing at Block 146. However, it will be understood by those having skill in the art that other routine maintenance categories may also be selected.

Finally, if trouble clearing is selected at Block 141, then a trouble clearing expert system is initiated at Block 147. The expert system can be initiated to respond to autonomous messages (Block 148) or to retrieve alarms (Block 149). Operation of the expert system for trouble clearing will be described below.

Figure 8F:
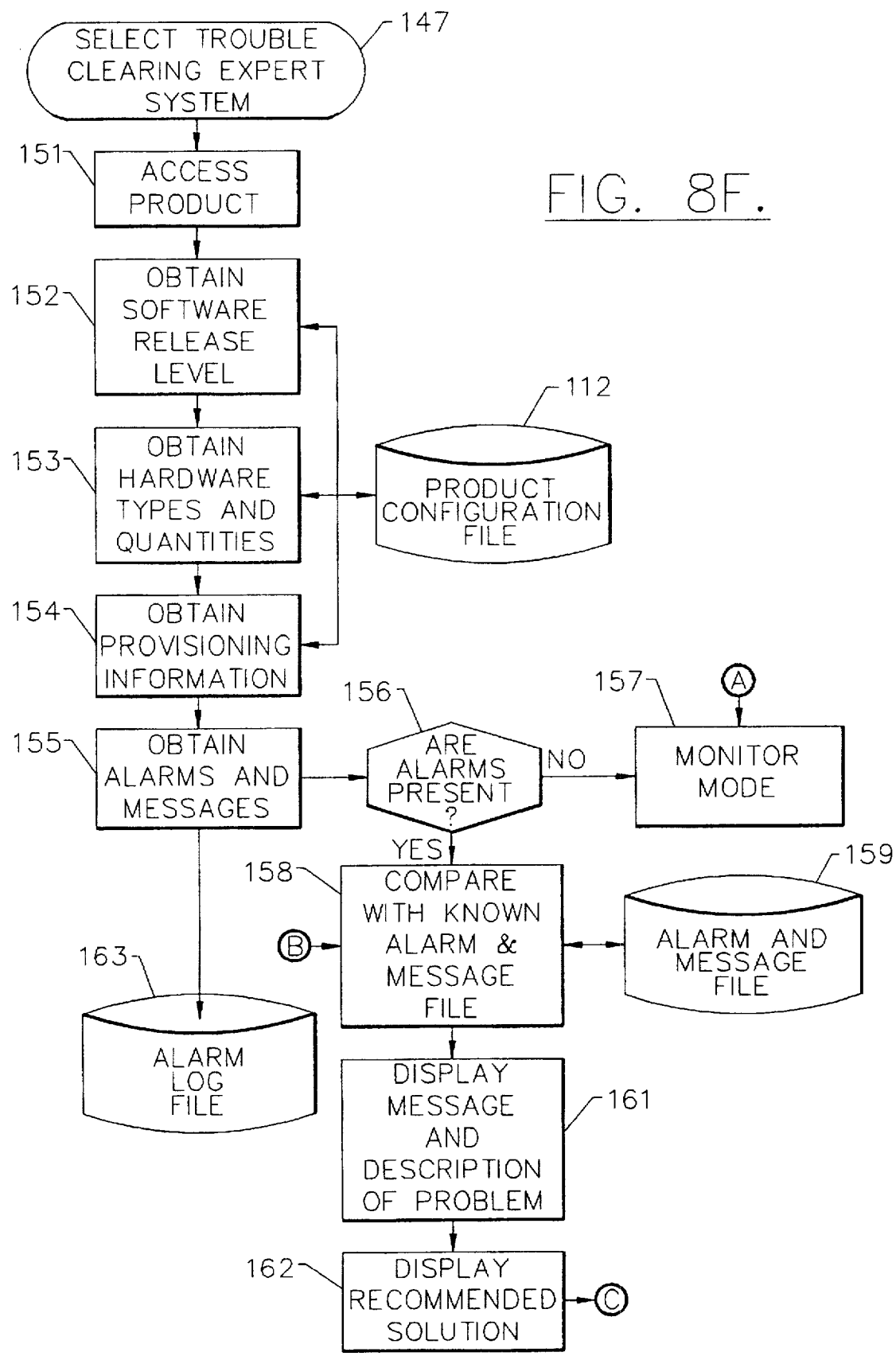
Figure 8G:
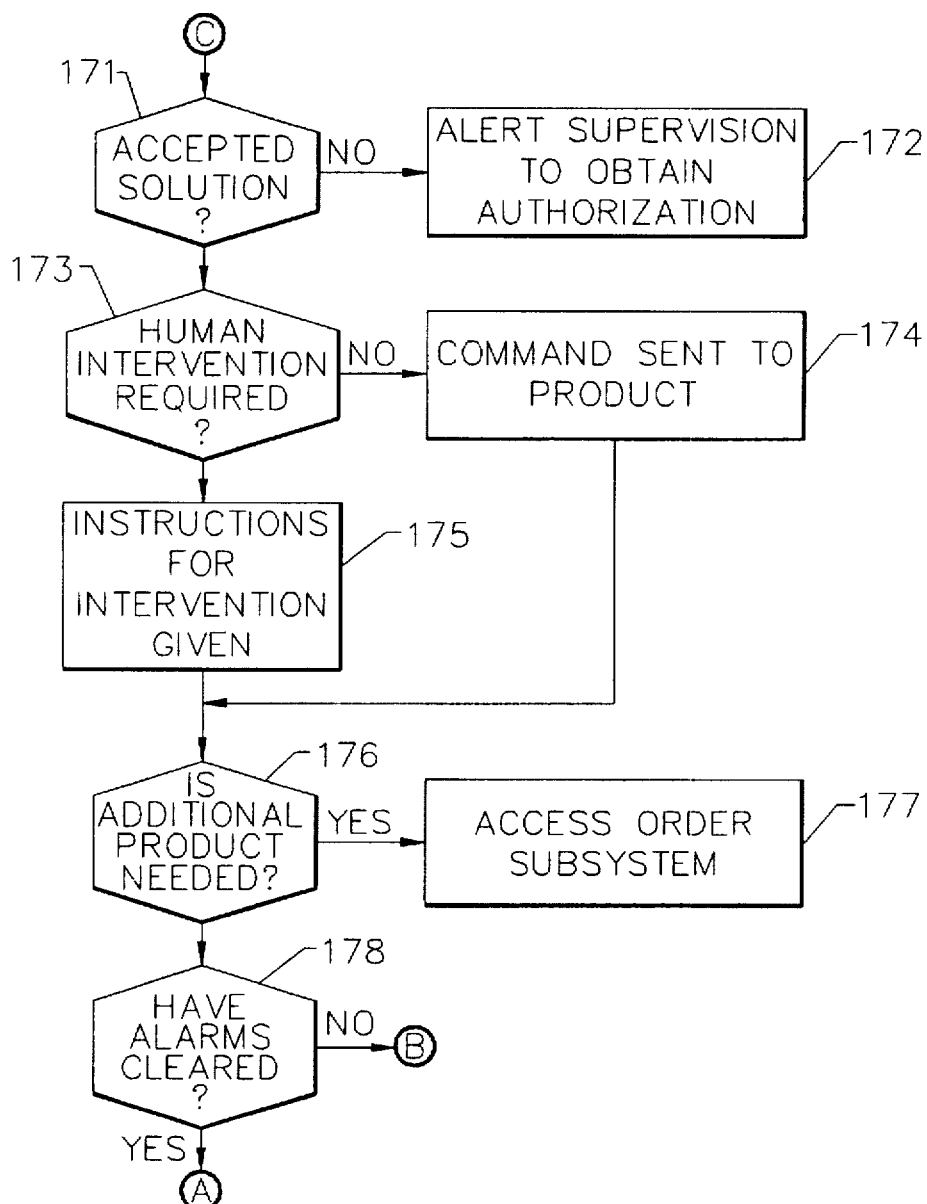

Referring now to FIGS. 8F and 8G, the operations of trouble clearing expert system (Block 147 of FIG. 8E), will now be described. As shown at Block 151, the product is first accessed. Upon accessing the product using the trouble clearing expert system, the screen of FIG. 9E may be displayed and in response to step 1 for setting up the parameters, the window of FIG. 9F may be displayed. The product configuration file (Block 112 of FIG. 8C) is then accessed to obtain the software release levels (Block 152), the hardware types and quantities (Block 153), and the provisioning information (Block 154).

Figure 9G:
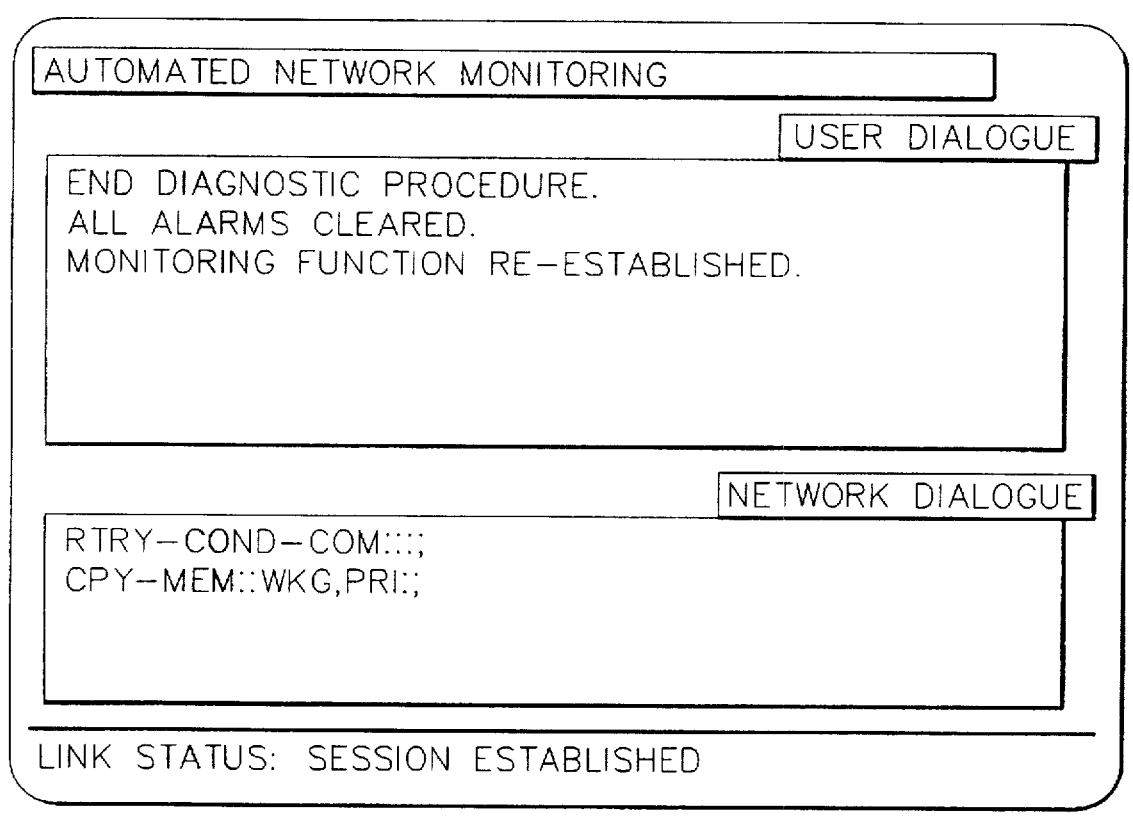

Still referring to FIG. 8F, at Block 155 alarms and messages are obtained from alarm log file 163. If alarms are not present at Block 156, then the expert system enters monitor mode at Block 157 by displaying the screen of FIG. 9G. On the other hand, if alarms are present at Block 156, then the alarms are compared with the known alarm and message file 159 at Block 158 and a message and description of the problem is displayed at Block 161.

The expert system 147 obtains a recommended solution and displays the recommended solution at Block 162. At Block 171 the user is asked if the solution is accepted. If not, then at Block 172 a supervisor may be alerted to obtain authorization or the user may be instructed to obtain authorization. If the recommended solution is accepted, then the expert system determines whether human intervention is required at Block 173. If no human intervention is required, then the appropriate commands are sent to the product at Block 174 to clear the problem. If, on the other hand, human intervention is required, then at Block 175 instructions for human intervention are given, for example, replace a failed hardware module.

If as a result of the trouble clearing process, additional product is needed (Block 176), then the order subsystem (Block 92 of FIG. 8A) is accessed at Block 177. If additional product information is not needed, the expert system determines whether alarms have cleared at Block 178. If they have cleared, then the expert system returns to monitor mode (Block 157). If alarms have not cleared, then the system looks at the next alarm and processes it at Block 158.

Accordingly, an expert system has been provided to provide automatic trouble clearing and monitoring of the product.

Figure 8H:
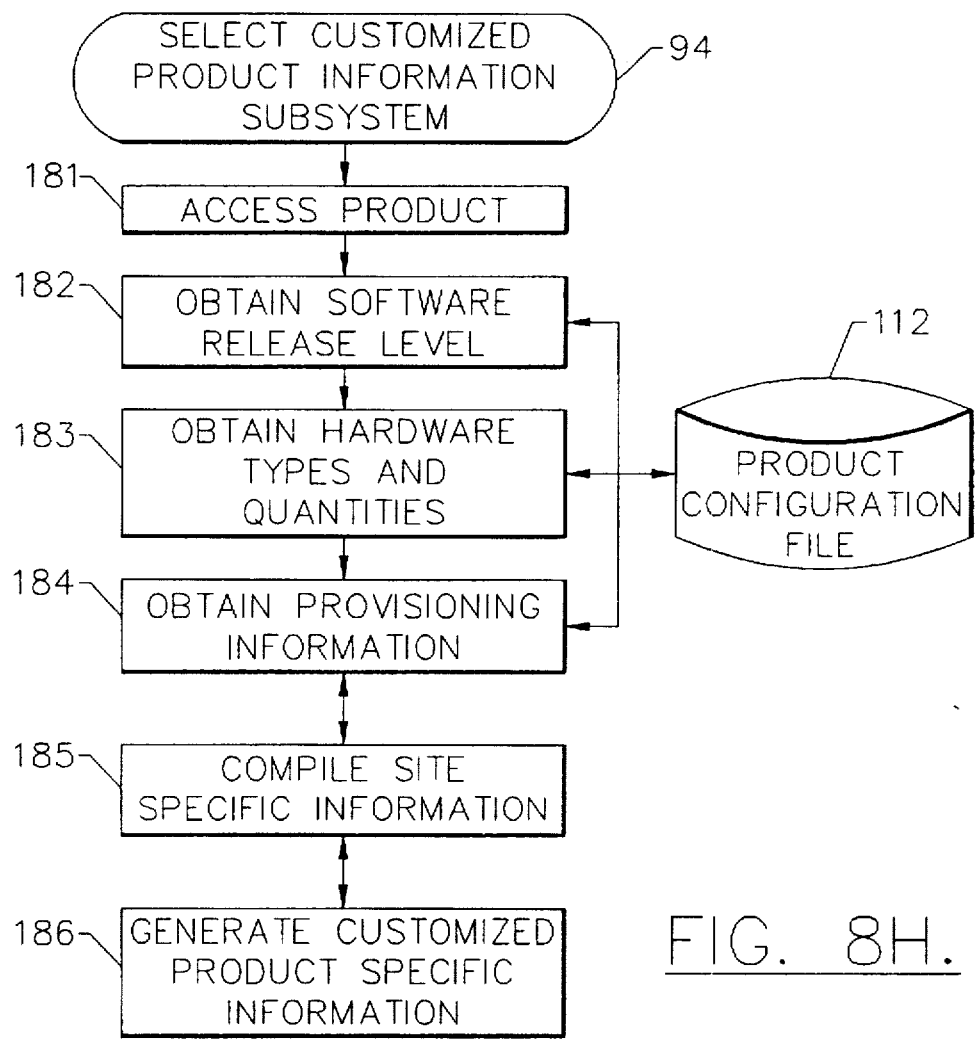

Referring now to FIG. 8H, the operations for generating customized product information (Block 94 of FIG. 8A) will now be described. As was already described, the system first accesses the product at Block 181 and obtains the software release level (Block 182), hardware types and quantities (Block 183), and provisioning information (Block 184) from the product configuration file 112. At Block 185 the information obtained at Blocks 182, 183 and 184 is used to convert the generalized product information to site specific information. The customized product specific information is then generated at Block 186.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for operating a data processing system, the data processing system comprising a plurality of hardware elements and a plurality of software elements for causing said hardware elements to perform predetermined application functions upon execution of said software elements on said hardware elements, said method comprising the following steps which are performed by said data processing system:

storing in said data processing system a plurality of online documentation modules, including at least a troubleshooting guide module, and an ordering guide module;

exchanging data between at least one of said software elements and at least one of said online documentation modules, in response to execution of said plurality of software elements and said plurality of documentation modules on at least one of said hardware elements, to produce interaction between said at least one software element and said at least one documentation module; and displaying results of the interaction between said at least one software element and said at least one online documentation module via a common user interface;

wherein said data exchanging step comprises the step of customizing the troubleshooting guide module to reflect said predetermined configuration of said hardware and software elements;

wherein said data exchanging step further comprises the step of customizing the ordering guide module to reflect said predetermined configuration of said hardware and software elements; and wherein said method further comprises the step of executing said customized ordering guide module and ordering a replacement part in response to an error in said data processing means upon execution of the customized troubleshooting guide module.

2. The method of claim 1, wherein said plurality of online documentation modules further includes a generalized installation procedures module, and wherein said data exchanging step further comprises the step of customizing the installation procedures module to reflect said predetermined configuration of said hardware and software elements; and wherein said method further comprises the following step which is performed in response to an indication that the replacement part has arrived; serially executing said customized installation procedures module and said troubleshooting module, to facilitate installation of the replacement part and troubleshooting of the data processing system including the installed replacement part, respectively.

3. A computer program product for execution on a data processing system comprising a plurality of hardware elements, said computer program product comprising:

a computer-readable storage medium having computer-readable program code means embodied in said medium, said computer-readable program code means comprising:

computer-readable program code means which provides a plurality of software elements which cause said hardware elements to perform predetermined application functions upon execution of said software elements on said hardware elements;

computer-readable program code means which provides a plurality of online documentation modules which execute on at least one of said hardware elements, including at least a troubleshooting guide module, and an ordering guide module;

computer-readable program code means, responsive to execution of said plurality of software elements and said plurality of online documentation modules on at least one of said hardware elements, for exchanging data between at least one of said software elements and at least one of said online documentation modules, to produce interaction between said at least one software element and said at least one online documentation module; and computer-readable program code means which provides a common user interface module, responsive to said data exchanging means, for displaying on a display, results of the interaction between said at least one software element and said at least one online documentation module;

wherein said data exchanging means comprises computer-readable program code means for generating a customized ordering guide module which reflects said predetermined configuration of said hardware and software elements;

wherein said data exchanging means further comprises computer-readable program code means for generating a customized ordering guide module which reflects said predetermined configuration of said hardware and software elements; and wherein said computer program product further comprises computer-readable program code means, responsive to an error in said data processing means upon execution of said customized troubleshooting guide module, for executing said customized ordering module and ordering a replacement part.

4. The computer program product of claim 3, wherein said plurality of online documentation modules includes a generalized installation procedures module, and wherein said data exchanging means further comprises means for generating a customized installation procedures module which reflects said predetermined configuration of said hardware and software elements; and wherein said computer program product further comprises computer-readable program code means, responsive to an indication that the replacement part has arrived, for serially executing said customized installation procedures module and said troubleshooting module, to facilitate installation of the replacement part and troubleshooting of the data processing system including the installed replacement part, respectively.

\* \* \* \* \*